March 18, 1941.   T. B. CHACE   2,235,199
METHOD OF CLADDING STEEL
Filed Nov. 5, 1938
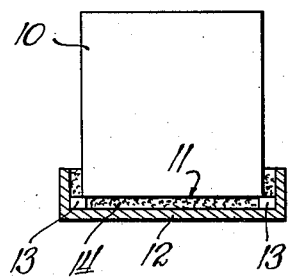
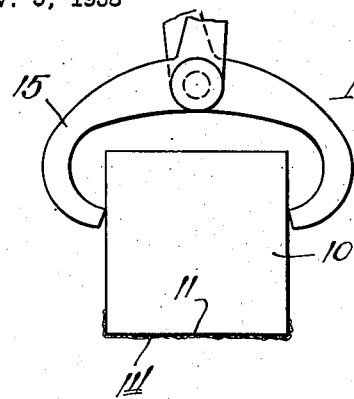
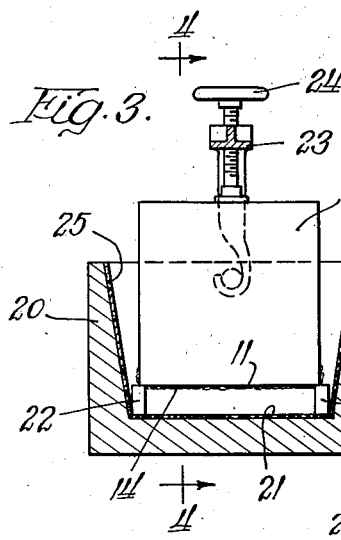
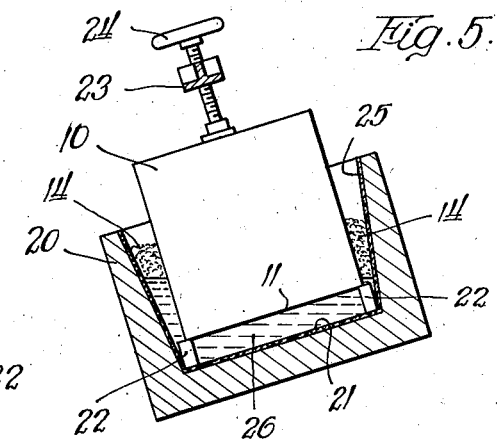
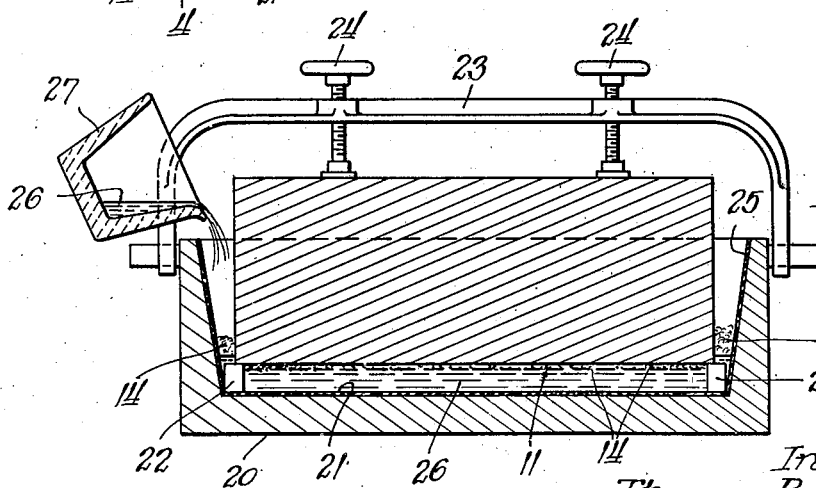
Inventor:
Thomas B. Chace.

Patented Mar. 18, 1941

2,235,199

UNITED STATES PATENT OFFICE 2,235,199

METHOD OF CLADDING STEEL

Thomas B. Chace, Winnetka, Ill.

Application November 5, 1938, Serial No. 239,086

3 Claims. (Cl. 22—204)

My invention relates generally to cladding metal, and it particularly relates to cladding steel with a facing of copper or copper base alloy.

In order to produce sheets, plates, or strips of composite metal economically, it has been found that it is necessary to first provide a relatively thick slab of composite metal. This relatively thick composite metal slab can be reduced to sheets, plates, or strips of the desired thickness by ordinary steel mill rolling practice. Thus, a slab of steel six inches or more in thickness may be cladded with a layer of copper or copper alloy one or two inches in thickness and the composite slab so formed, can be reduced to composite metal sheet of approximately any desired thickness, such, for example, as one-half or one-quarter of an inch. The advantage of such a method lies in the fact that by starting with a relatively thick slab and reducing it to relatively thin sheets or plates, the initial welding or bonding surface is greatly reduced.

However, the cladding of a relatively thick slab of steel with a layer of copper or copper alloy is not without its difficulties. The conditions to be met are, that, the surface of the steel slab must be cleaned and freed from scale or other impurities; the slab must be preheated to around the melting point of the cladding metal; the cleaned surface must be protected from oxidation during the cladding operation; and, the molten cladding metal must be maintained and confined to contact with the cleaned surface long enough for it to become integrally bonded thereto. Two of the most difficult of these conditions to be met are; the protection of the cleaned surface of the preheated slab from oxidation and the confinement of the molten cladding metal to the surface long enough for the desired bonding to be effected.

The object of my invention, generally stated, is to provide for cladding a relatively thick slab of backing metal with a layer of facing metal, in which conventional technique and equipment are used.

Another object of my invention is to protect the bonding surface of the slab of backing metal from oxidation during preheating.

Another important object of my invention is to confine the molten cladding metal to the surface to be cladded during the bonding operation in an improved manner.

Another object of my invention is to provide for freeing slag and like inclusions from the cladded surface.

Other objects from my invention will, in part, be obvious and in part appear hereinafter.

For a more complete understanding of the nature and scope of my invention, reference may be had to the following detailed description taken in connection with the accompanying drawing, in which:

Figure 1 shows an assembly with a slab of backing metal by which it may be preheated with its cleaned surface protected from oxidation;

Figure 2 illustrates how the preheated slab may be transferred to a mold for cladding with a coating of slag adhering to its cleaned surface;

Figure 3 shows the preheated slab of backing metal placed and secured in one type of mold construction that may be used;

Figure 4 is a sectional view taken on line 4—4 of Figure 3 illustrating how the mold space may be poured with cladding or facing metal; and Figure 5 illustrates how the mold may be tilted after pouring in order to float any slag or similar inclusions from the cladding surface to the top of the molten cladding metal.

Referring now particularly to Figure 1 of the drawing, a steel backing slab 10 is shown, a surface 11 of which it is desired to clad with a facing metal. The steel backing slab 10 is of substantial thickness, for example six inches or more, and the surface 11 is cleaned by pickling and/or sand blasting. In order to prevent oxidation of the surface 11 during the preheating of the slab 10 it is disposed in a pan 12 containing powdered slag or flux 14. The pan 12 is relatively shallow as compared with the thickness of the slab 10 and may be made of steel, cast iron or a suitable refractory material. Spacers 13, of refractory material are provided to space the slab 10 from the bottom of the pan 12. The powdered slag or flux 14 may be powdered glass, borax, boric acid or other suitable material. Sufficient of the powdered slag 14 should be used so that when it is melted it will extend up around the sides of the slab 10 a little distance, thereby insuring that the surface 11 will not be exposed. The weight of the slab 10 compresses the powdered slag or flux 14 and forces it to compress around its edges and sides, thereby protecting the cleaned surface 11 before preheating. If desired, the slag 14 may be first melted and heated so that it is liquid, and then may be poured into the pan 12 after the slab 10 has been positioned therein. However, by using the slag or flux 14 in powdered form the surface 11 may be very well protected and there appears to be no advantage in first melting the slag or flux 14 and pouring it into the pan 12.

After the assembly shown in Figure 1 has been prepared, the slab 10 is then ready to be preheated. The preheating furnace used for this may be of the pusher type, so that the slabs 10 together with the pan 12 are pushed through from the inlet side and out the outlet side during the preheating period, or it may be of a car-bottom type comprising individual cars holding one or more slab and pan assemblies. The slab 10 may be preheated to a temperature of around 2250° F., at which temperature the powdered flux or slag 14 is molten and protects the surface 11 from the furnace atmosphere.

The slab 10 having been preheated to the desired degree, is removed from the preheating furnace and transferred to a conventional open mold 20 shown in Figure 3 of the drawing. The mold 20 should be slightly larger than the slab 10 and the sides may well slope outwardly to some extent. The transfer of the preheated slab 10 from the preheating furnace to the mold 20 is illustrated in Figure 2 of the drawing. In this figure a pair of tongs 15 are shown carrying the slab 10 with the surface 11 on the bottom. A thin layer of molten slag 14 adheres to the surface 11 when it is removed from the pan 12 and this protects it from oxidation during the transfer and up to the time it is bonded to a layer of cladding metal. I have found that even though the slab 10 be cooled to room temperature, this thin layer of slag 14 remains intact. After cooling the slag 14 is, of course, brittle but when broken up the surface 11 underneath is found to be perfectly clean.

Referring now particularly to Figure 3 of the drawing, the preheated slab 10 is shown in its position in the mold 20. The slab 10 is spaced from the bottom 21 of the mold 20 a distance equal to the thickness of the desired layer of facing metal by loose spacer blocks 22. The spacer blocks 22 can be of steel which are later cast in the facing metal as inserts and may be later rolled down with the composite slab and then trimmed off. In order to secure the slab 10 in place in the mold 20, a yoke 23 is provided carrying heavy screws 24. After the slab 10 has been set in the mold 20 on the spacer blocks 22 the yoke 23 may be put in place and the screws 24 tightened down until they engage the slab 10 and firmly hold it in place. It will be understood that the yoke 23 may be replaced by any other suitable securing means desired.

With a view to showing how a layer of facing metal may be cladded on the surface 11, reference may now be had particularly to Figure 4 of the drawing. The inside of the mold 20 is first prepared with a mold dressing 25 to prevent the molten facing metal from adhering thereto. Molten facing or cladding metal 26 may be poured into one side of the mold 20 from the ladle 27. Sufficient facing metal 26 is poured so that the space between the surface 11 of the slab 10 and the bottom 21 of the mold 20 will be filled, and the molten facing metal 26 will extend a little way up the sides of the slab 10.

Since the slag 14 and other like impurities are lighter than the molten facing metal 26, they will float to the top thereof. However, in order to make sure that no impurities remain in contact with the surface 11 to prevent the bonding of the facing metal 26 thereto, the entire mold assembly, shown in Figure 4, may be tilted at an angle as shown in Figure 5 of the drawing. This insures that any slag 14 or other inclusions remaining in contact with the surface 11 will be worked out and floated up to the top of the molten facing metal 26. After all of the slag 14 or other impurities have thus been worked out, the whole assembly is returned to a horizontal position.

The preheated slab 10 will maintain the molten facing metal 26 in the molten condition for some time, depending largely on the temperature to which it has been preheated. In this manner the length of time required for the bonding of the facing metal 26 to the surface 11 may be secured.

After the facing metal 26 has bonded to the surface 11 and solidified, the slab 10 may be removed from the mold 20 and rolled down to a sheet or plate of the desired thickness. The excess facing metal 26, slag 14 and other inclusions along the edges are of course trimmed off after rolling.

By using the method outlined above it is possible to clad a surface of a relatively thick steel backing slab with a layer of facing metal using conventional foundry methods, technique, and equipment. The requirements of protecting the cleaned cladding surface from oxidation and confining the molten cladding metal to the clean surface during bonding have thus been satisfactorily and economically met.

Since certain changes may be made in the foregoing method without departing from the spirit and scope thereof, it is intended that all matters shown in the accompanying drawing as set forth in the foregoing description shall be interpreted as illustrative and not in a limiting sense.

I claim as my invention:

1. The method of cladding a single surface which is to be worked and rolled of a slab of backing metal with a layer of facing metal which comprises; preheating said slab with said surface submerged in molten slag, transferring the preheated slab into a mold in such manner that said surface is on the bottom and spaced from the floor of said mold a distance equal to the desired thickness of said facing layer, securing said slab in its position in said mold, pouring facing metal into said mold, tilting said mold to allow substantially all slag to rise to the surface of the molten facing metal.

2. The method of cladding a single surface which is to be worked and rolled of a slab of backing metal with a layer of facing metal which comprises; preheating said slab with its lower face submerged in a molten slag, transferring the preheated slab with a protecting coat of slag adhering thereto into a mold, said lower face being spaced from the bottom of said mold a distance equal to the thickness of the facing layer desired, pouring molten facing metal into said mold to more than fill said space between said lower face and the bottom of said mold, tilting said mold so filled to allow substantially all the slag to rise to the top of the molten facing metal, and returning said mold to its horizontal position to allow the facing metal to bond to said lower face.

3. The method of cladding a single surface which is to be worked and rolled of a slab of backing metal with a layer of facing metal which comprises; preheating said slab with said surface submerged in molten slag, transferring the preheated slab into a mold in such manner that said surface is on the bottom and spaced from the floor of said mold a distance equal to the desired thickness of said facing layer, securing said slab in its position in said mold, pouring facing metal into said mold, tilting said mold to allow substantially all the slag to rise to the surface of the molten facing metal, and returning said mold to its original position, said lower face to be cladded being unexposed to the atmosphere during its transfer and during the pouring of said facing metal.

THOMAS B. CHACE.